(12) United States Patent
Sugimoto et al.

(10) Patent No.: US 7,242,278 B2
(45) Date of Patent: Jul. 10, 2007

(54) PORTABLE TRANSMITTER CONTAINED IN A HARD-TO-OPEN CASE

(75) Inventors: Keiichi Sugimoto, Kariya (JP); Mitsuru Nakagawa, Chiryu (JP)

(73) Assignee: DENSO Corporation, Kariya (JP)

( * ) Notice: Subject to any disclaimer, the term of this patent is extended or adjusted under 35 U.S.C. 154(b) by 299 days.

(21) Appl. No.: 10/817,922

(22) Filed: Apr. 6, 2004

(65) Prior Publication Data

US 2004/0201451 A1 Oct. 14, 2004

(30) Foreign Application Priority Data

Apr. 10, 2003 (JP) .............................. 2003-106739

(51) Int. Cl.
- B65D 41/16 (2006.01)
- G06F 7/06 (2006.01)
- H05K 5/00 (2006.01)
- H04M 1/00 (2006.01)

(52) U.S. Cl. .................... 340/5.62; 340/7.63; 220/780; 455/575.8; 361/752

(58) Field of Classification Search ............... 340/5.62, 340/7.63, 7.62; 220/780; 455/575.8
See application file for complete search history.

(56) References Cited

U.S. PATENT DOCUMENTS

| | | | | |
|---|---|---|---|---|
| 3,693,089 | A * | 9/1972 | Hutchinson et al. ....... | 340/7.63 |
| 4,804,082 | A * | 2/1989 | Stein ........................... | 220/214 |
| 5,220,319 | A * | 6/1993 | Kendel ................... | 340/825.69 |
| 5,351,051 | A | 9/1994 | Yano et al. | |
| 5,561,420 | A | 10/1996 | Kleefeldt et al. | |
| 5,774,060 | A | 6/1998 | Ostermann et al. | |
| 5,822,192 | A * | 10/1998 | Hayashi ...................... | 361/752 |
| 5,992,663 | A * | 11/1999 | Mitchell .................... | 220/4.21 |
| 6,011,320 | A * | 1/2000 | Miyamoto et al. ......... | 307/10.2 |

(Continued)

FOREIGN PATENT DOCUMENTS

JP    A-H08-205269    8/1996

(Continued)

OTHER PUBLICATIONS

Reasons for Rejection from Japanese Patent Office issued on Jul. 4, 2006 for the corresponding Japanese patent application No. 2003-106739 (a copy and English translation thereof).

(Continued)

Primary Examiner—Brian Zimmerman
Assistant Examiner—Clara Yang
(74) Attorney, Agent, or Firm—Posz Law Group, PLC

(57) ABSTRACT

An ID code is wirelessly sent to a device, such as a keyless-entry system or a keyless-starter system mounted on an automobile, from a portable transmitter. Electronic components including an electronic circuit board, a transponder and a battery are all contained in a resin case. The resin case is composed of a front case and a rear case, both firmly connected to each other. The case cannot be opened to take away the transponder contained therein without breaking the case. If the case is forcibly opened, a trace showing such a fact is unavoidably left on the case. The battery contained in the case, however, can be replaced or unloaded without breaking the case through an opening formed exclusively for the battery.

6 Claims, 8 Drawing Sheets

U.S. PATENT DOCUMENTS

| | | | |
|---|---|---|---|
| 6,405,213 B1 * | 6/2002 | Layson et al. | 340/825.36 |
| 6,628,008 B2 * | 9/2003 | Steinmueller et al. | 307/10.3 |
| 6,888,241 B1 | 5/2005 | Korn et al. | |
| 2002/0153995 A1 * | 10/2002 | Kumano | 340/5.62 |

FOREIGN PATENT DOCUMENTS

| | | |
|---|---|---|
| JP | A-2000-124626 | 4/2000 |
| JP | A-2001-115699 | 4/2001 |
| JP | A-2001-140513 | 5/2001 |
| JP | A-2003-090152 | 3/2003 |

OTHER PUBLICATIONS

Reasons for Rejection from Japanese Patent Office issued on Oct. 17, 2006 for the corresponding Japanese patent application No. 2003-106739 (a copy and English translation thereof).

\* cited by examiner

PORTABLE TRANSMITTER CONTAINED IN A HARD-TO-OPEN CASE

CROSS-REFERENCE TO RELATED APPLICATION

This application is based upon and claims benefit of priority of Japanese Patent Application No. 2003-106739 filed on Apr. 10, 2003, the content of which is incorporated herein by reference.

BACKGROUND OF THE INVENTION

1. Field of the Invention

The present invention relates to a portable transmitter, which is advantageously used as a transmitter in a keyless-entry system for an automobile and in a keyless-starter system.

2. Description of Related Art

In conventional transmitters of this kind, a transponder for wirelessly transmitting an identification code (ID code) to a device to be operated is contained in a case. In a keyless-starter system for an automobile, for example, the engine is permitted to start when an IC code sent form the transmitter coincides with an ID code pre-installed in the automobile.

An example of the transmitter of this kind is disclosed in JP-A-2001-140513. A case containing components of the transmitter including a transponder and a battery is composed of a front case and a rear case, both being detachably connected. To replace a worn battery with a new one, it is necessary to be able to easily open the case. The case structure having the front case and the rear case detachably connected to each other, however, involves the following problem. The case may be opened by an unauthorized person such as a thief, and the transponder may be stolen without leaving a trace that the case was opened by someone. The thief is able to start the engine using the transponder to steal the automobile. Since no trace showing such an unauthorized act is left, it is highly possible that the owner does not notice for a certain period of time that the transponder is taken out from the transmitter case. Therefore, the possibility that the automobile is stolen will increase. The same problem is involved in the keyless-entry system.

SUMMARY OF THE INVENTION

The present invention has been made in view of the above-mentioned problem, and an object of the present invention is to provide an improved portable transmitter, in which a transponder contained therein is difficult to be taken away without leaving a trace on the transmitter case.

The portable transmitter includes an electronic circuit board, a battery for supplying power to the electronic circuit board, and a transponder, all these components being contained in a resin case. An ID code (an identification code) that allows a device to be operated upon receipt of the ID code is wirelessly transmitted from the portable transmitter to the device such as a keyless-entry system or a keyless-starter system for an automobile. When the battery voltage is normal, the ID code is transmitted from the electronic circuit board, and when the battery voltage is abnormally low, the ID code is transmitted from the transponder.

The resin case of the portable transmitter is composed of a front case and a rear case, both being firmly connected not to be easily separated. The front case includes a front hook having a projection and a depression, and similarly the rear case includes a rear hook having a projection and a depression. The projection of the front hook engages with the depression of the rear hook, while the projection of the rear hook engages with the depression of the front hook. Alternatively, the projection may be formed in either the front hook or the rear hook, and the projection may be engaged with the depression formed in the other hook.

Since the front case and the rear case are firmly connected not to be easily separated, if the case is forcibly opened, either the front hook or the rear hook is broken. Therefore, a trace showing that the case was forcibly opened is unavoidably left on the case. However, the battery has to be loaded or unloaded without breaking the case. Therefore, an opening through which only the battery is taken out is formed. A sealing member is disposed between the front case and the rear case to keep the case water-tight. A sealing surface which the sealing member contacts is molded not to leave any slide line of a molding die.

According to the present invention, the transponder contained in the case cannot be taken away without breaking the case. An owner of the portable transmitter easily recognizes the fact that the case was forcibily opened. Therefore, the possibility that an automobile is stolen using the taken-away transponder can be considerably reduced.

Other objects and features of the present invention will become more readily apparent from a better understanding of the preferred embodiment described below with reference to the following drawings.

DETAILED DESCRIPTION OF THE PREFERRED EMBODIMENT

Figure 1:
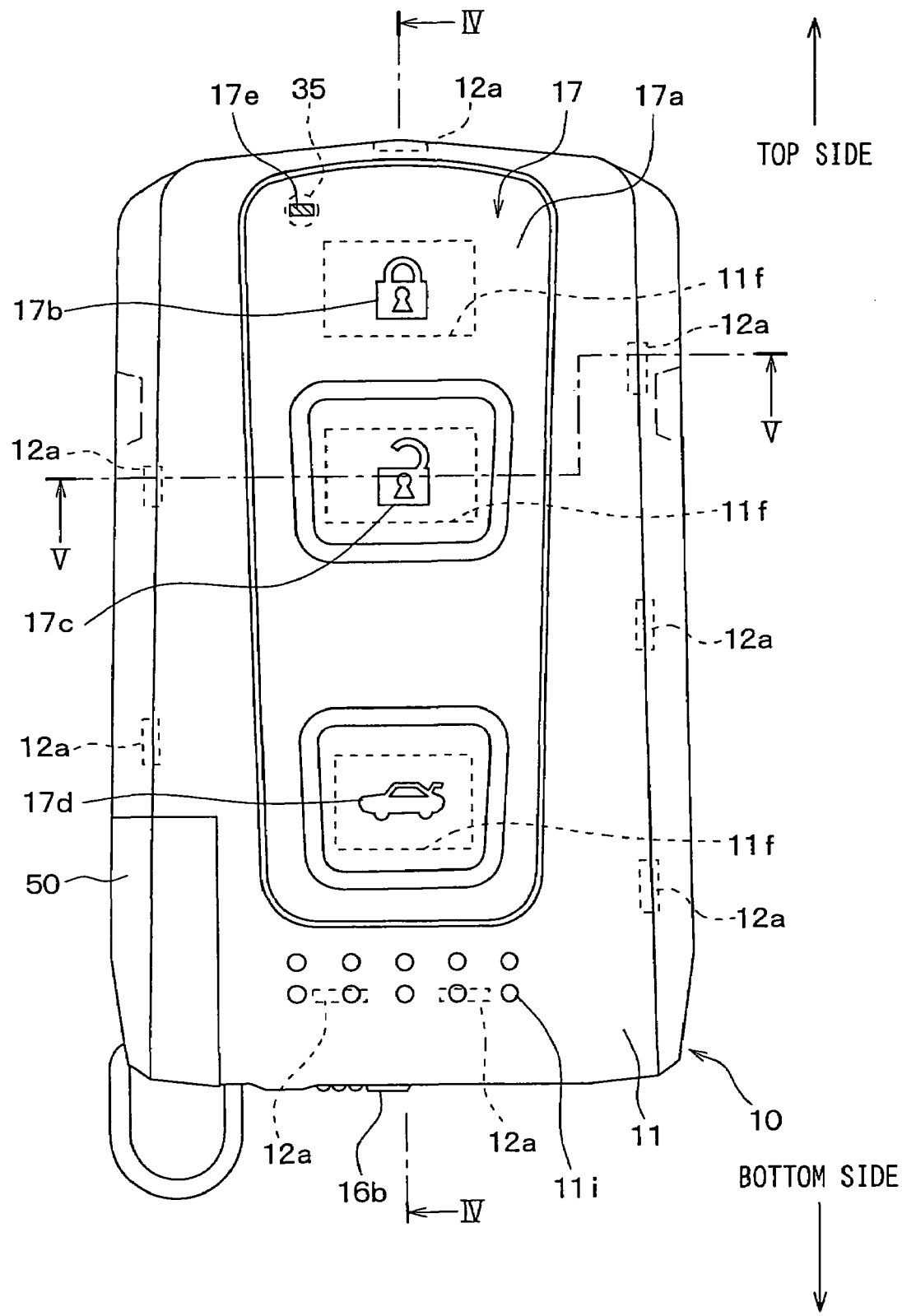
FIG. 1 is a plan view showing a portable transmitter according to the present invention, viewed from a front side thereof.

A preferred embodiment of the present invention will be described with reference to accompanying drawings. As an example of the portable transmitters of the present invention, a transmitter for used in a keyless-entry system of an automobile will be described. In the keyless-entry system, as well known, an identification code (ID code) is wirelessly transmitted to an automobile from a portable transmitter. When the ID code sent from the transmitter coincides with an ID code pre-stored in the automobile, the door is automatically locked or unlocked according to a signal showing an intention of the user. In this manner, the user of the automobile is able to lock or unlock the door without using a mechanical key from a position a certain distance apart from the automobile.

A keyless-starter system is also known hitherto. In the keyless-starter system, an automobile engine is automatically started upon receipt of an ID code wirelessly transmitted from a portable transmitter. Thus, the engine can be started without using a mechanical key in the similar manner as in the keyless-entry system. The portable transmitter according to the present invention is also applicable to other wireless control systems such as a system for starting a motor in an electric vehicle.

Referring to FIGS. 1–8, the structure and the function of the portable transmitter of the present invention will be described. The portable transmitter is composed of a resin case 10 and components contained therein. The components include a battery (a button-type) 20, an electronic circuit board 30, a transponder 40 and a mechanical key 50.

The case 10 is composed of a front case 11 and a rear case 12, both being connected not to be separated from each other (undetachably connected). The components of the transmitter are contained therein before the front case 11 is connected to the rear case 12. The structure connecting the front case 11 to the rear case 12 is shown in FIG. 6 in a scale enlarging a part of a cross-sectional view shown in FIG. 5. The front case 11 includes plural front hooks 11a extending toward the rear case 12, and the rear case 12 includes plural rear hooks 12a for engaging with the front hooks 11a.

As shown in FIG. 6, a projection 11b and a depression 11c are formed on the front hook 11a. Similarly, projection 12b and depression 12c are formed on the rear hook 12a. The projection 11b of the front hook 11a engages with the depression 12c of the rear hook 12a, and the projection 12b of the rear hook 12a engages with the depression 11c of the front hook 11a. A tapered surface 11d is formed on the projection 11b so that the projection 11b easily engages with the depression 12c. Similarly, a tapered surface 12d is formed on the projection 12b so that the projection 12b easily engages with the depression 11c. Engaging surfaces 11e and 12e of respective projections 11b and 12b extend substantially in a longitudinal direction of the case 10. Therefore, it is impossible to separate the front case 11 from the rear case 12 without breaking either one of the front hook 11a or the rear hook 12a. As also shown in FIG. 6, an O-ring 18b (18a) as a first seal member is disposed between the front case 11 and the rear case 12. The O-ring 18b contacts a sealing surface 11h of the front case and a sealing surface 12i of the rear case 12.

Figure 4:
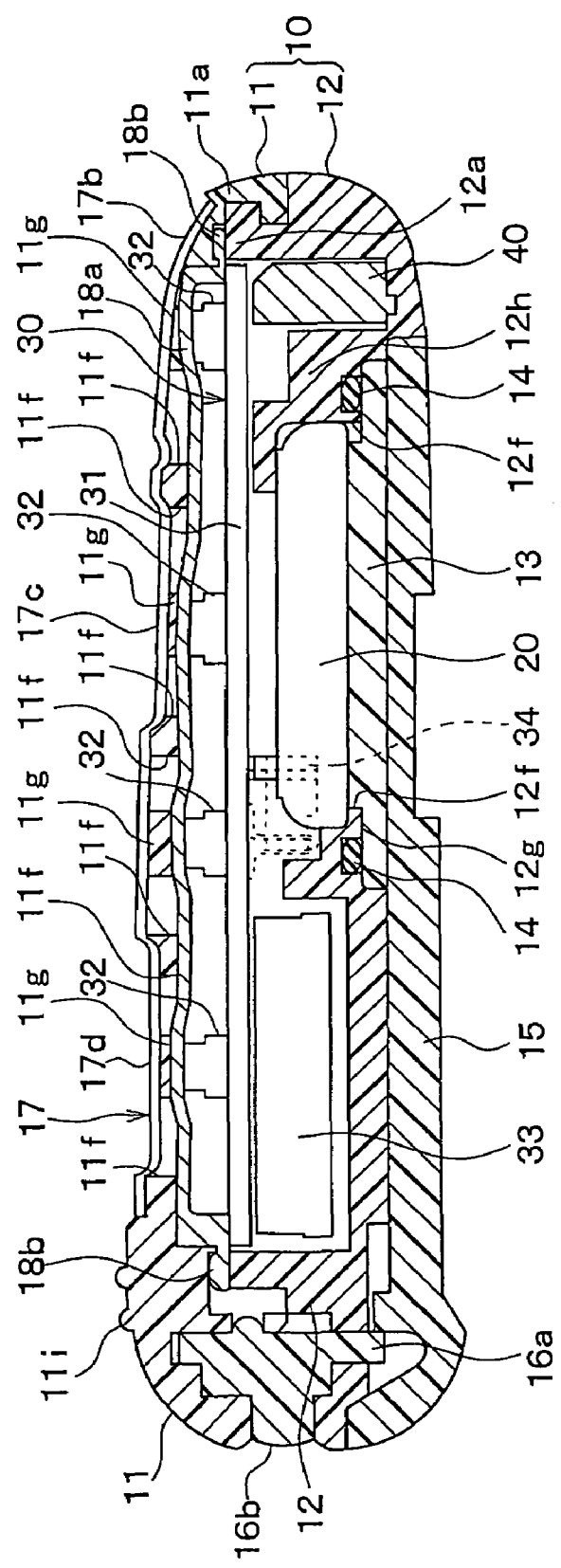
FIG. 4 is a cross-sectional view showing the transmitter, taken along line IV—IV shown in FIG. 1.

As shown in FIG. 4, the battery 20 that supplies power to the electronic circuit board 30 is contained in the case 10. The battery 20 can be loaded or unloaded through an opening 12f formed in the rear case 12 without separating the front case 11 form the rear case 12. A projected lip 12g extending toward the opening 12f serves as a member for preventing the battery 20 from dropping off. A battery cover 13 closing the opening 12f is fixed to the rear case 12 with screws N (shown in FIG. 7). The battery cover 13 can be removed by loosening the screws N when necessary for replacing a worn battery with a new one. A second seal member 14 (an O-ring made of rubber) is disposed around the opening 12f to be compressed with the battery cover 13 to thereby keep the inner space water-tight.

Figure 7:
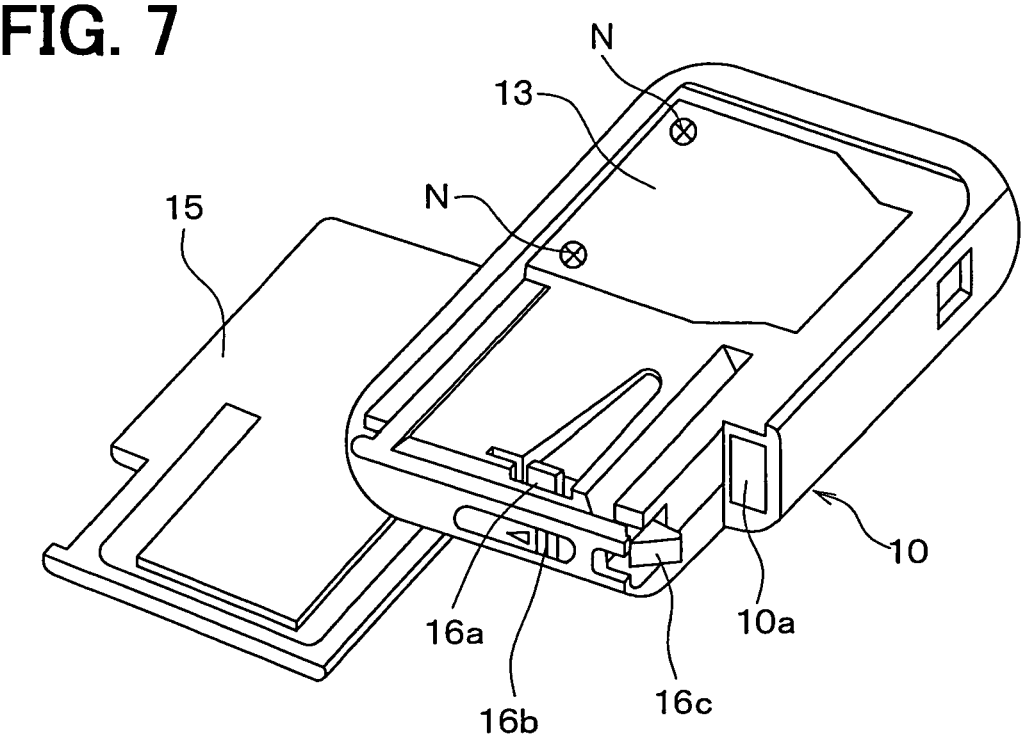
FIG. 7 is a perspective view showing the rear side of the transmitter, with a sliding cover covering an opening at the rear side removed.
Figure 8:
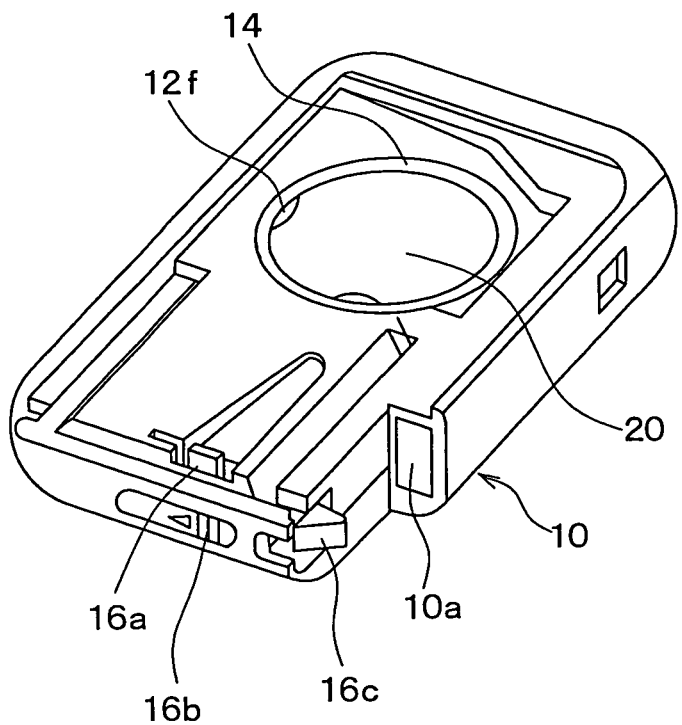
FIG. 8 is a perspective view showing the rear side of the transmitter, with both of a sliding cover and a battery cover removed.

The rear surface of the transmitter is covered with a sliding cover 15 after the battery cover 13 is fixed to the rear case 12 with the screws N. FIG. 7 shows the rear side of the transmitter with the sliding cover 15 removed, and FIG. 8 shows the rear side with both of the battery cover 13 and the sliding cover 15 removed. The sliding cover 15 can be fixed to or removed from the rear surface by sliding the sliding cover 15 in the longitudinal direction of the case 10.

As shown in FIGS. 7 and 8, a hook 16a for stopping the sliding cover 15 at its position is provided on the rear surface of the case 10. A lever 16b connected to the hook 16a is provided at the bottom side of the case 10. The hook 16a stopping the sliding cover 15 is released by operating the lever 16b. The mechanical key 50 is contained in a space 10a formed in the case 10. The mechanical key 50 can be taken out from the space 10a by releasing a key hook 16c and by sliding the mechanical key 50 in the longitudinal direction of the case 10. The key hook 16c functions to fixedly contain the mechanical key 50 in the space 10a. The key hook 16c is connected to the lever 16b. The key hook 16c can be moved to the position releasing the mechanical key 50 by operating the lever 16b.

As shown in FIG. 4, the electronic circuit board 30 is formed by mounting tact switches 32, an antenna 33, a terminal 34, an integrated circuit and other components on a printed circuit board 31. The printed circuit board 31 is fixedly mounted on the rear case 12 from its front side. The tact switches 32 are positioned on the front surface of the printed circuit board 31. The terminal 34 to be connected to a plus terminal of the battery 20, another terminal to be connected to a minus terminal of the battery 20, and the antenna 33 are mounted on the rear surface of the printed circuit board 31.

The transponder 40 is press-fitted to the rear case 12 so that it can be firmly fixed to the rear case 12. The transponder 40 is separated from the battery 20 by a separating wall 12h to prevent the transponder 40 from being taken out from the opening 12f when the battery cover 13 is removed. The electronic circuit board 30 is powered by the battery 20 and is adapted to automatically transmit the ID code. When the tact switch 32 is pushed by the user, the ID code is transmitted from the electronic circuit board 30.

Figure 5:
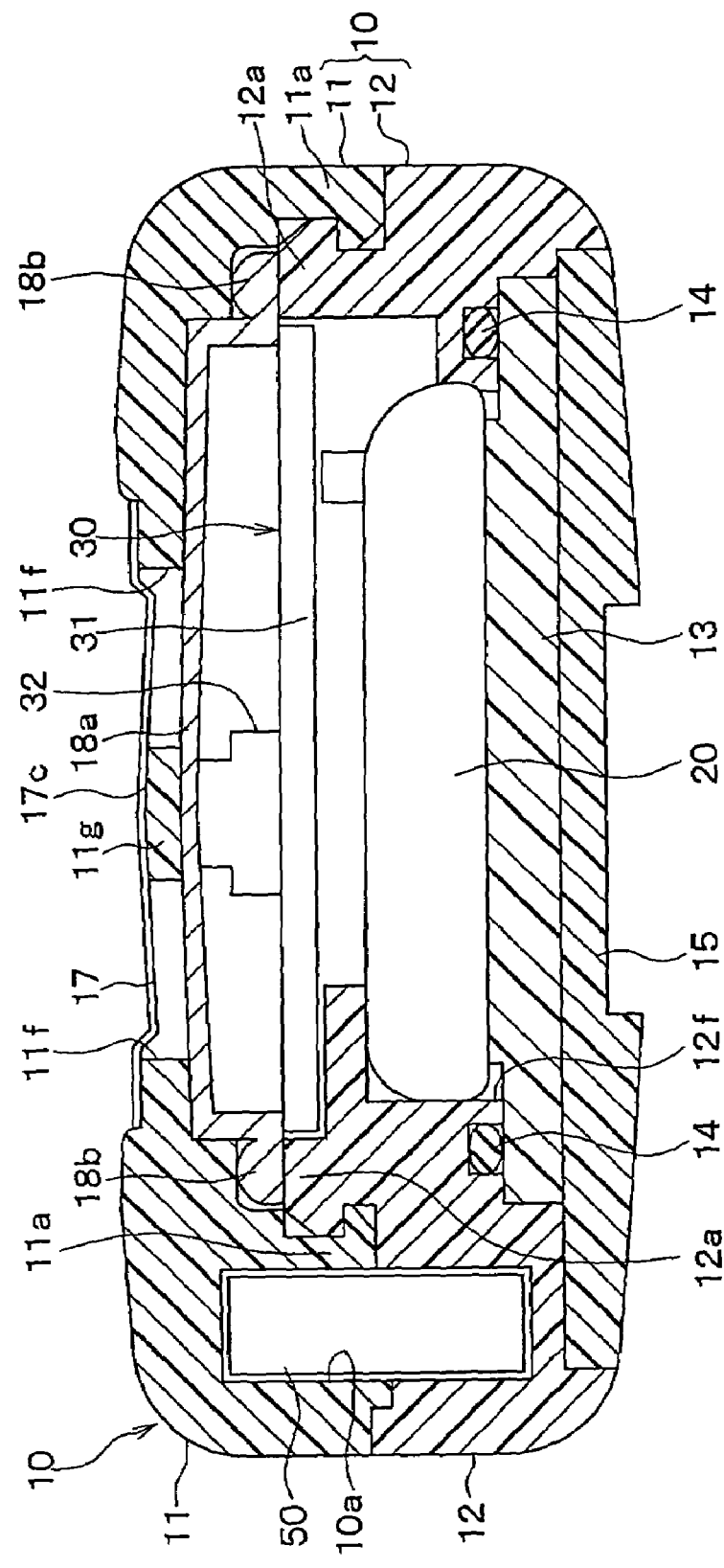
FIG. 5 is a cross-sectional view showing the transmitter, taken along line V—V shown in FIG. 1.
Figure 6:
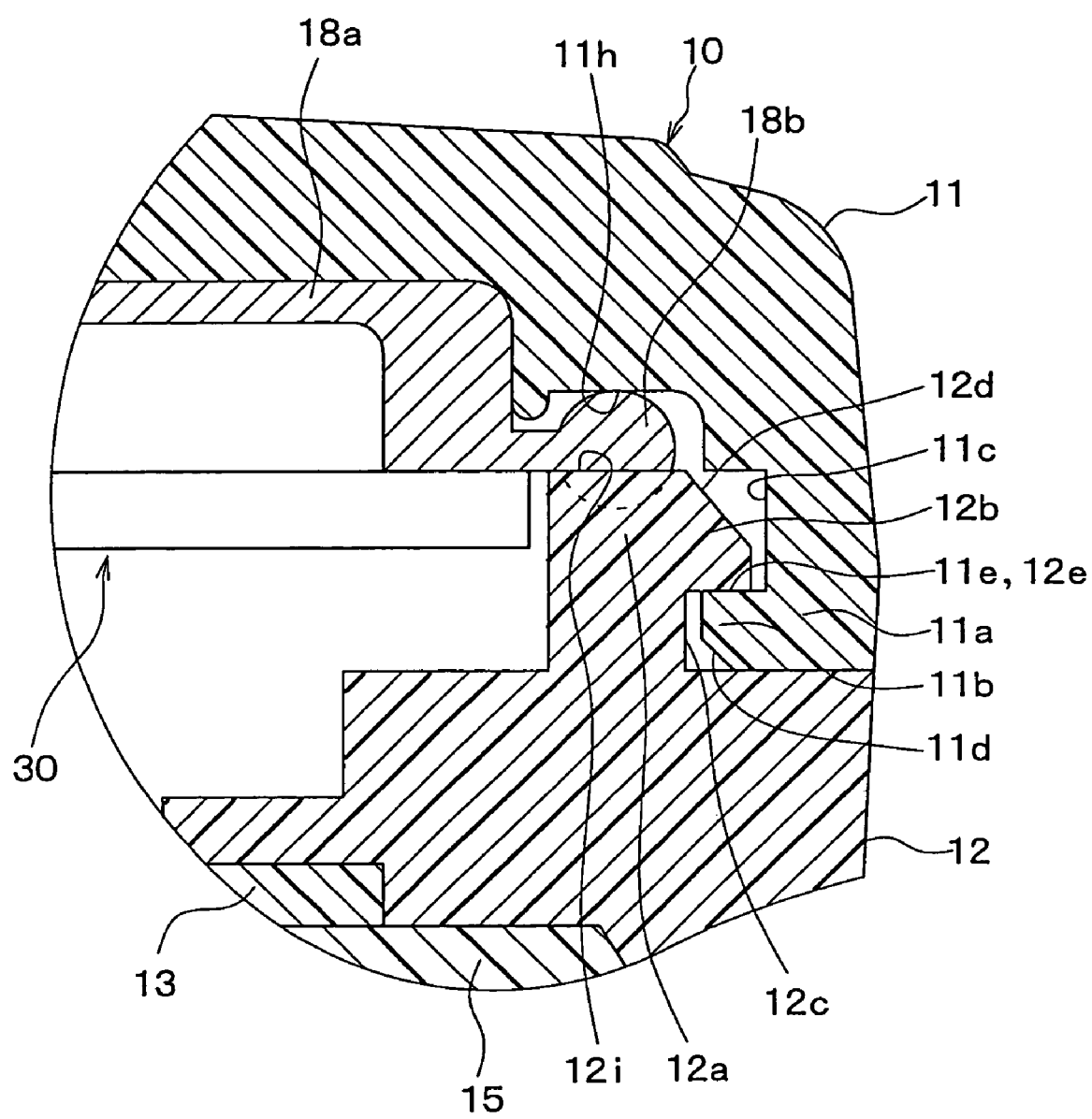
FIG. 6 is a cross-sectional view showing a portion where a front case engages with a rear case, in an enlarged scale.

As shown in FIGS. 1, 4 and 5, openings 11f corresponding to the respective tact switches 32 are formed on the front surface of the front case 11. The openings 11f are covered with a front film 17 that is integrally formed with the front case 11. By pushing the front film 17 at a position corresponding to a particular tact switch 32, the tact switch 32 can be operated. The front film 17 is formed by printing function displays 17b, 17c, 17d (pictures or letters showing functions) on the rear surface of a transparent resin film 17a. Since the function displays are printed on the rear surface, they are not erased by frequently touching the front surface. Background designs or pictures are also printed on the rear surface of the front film 17 to enhance the ornamental design of the transmitter by hiding the components located behind the front film 17.

A repulsive force against a force pushing the tact switch 32 is a sum of a spring back force of the tact switch itself and a resilient force of the front film 17. As the size of the opening 11f becomes smaller, the resilient force against the force pushing the tact switch 32 becomes larger. Therefore, the size of the opening 11f is determined to obtain an optimum repulsive force against the force pushing the tact switch 32.

As shown in FIG. 1, the function display 17b corresponds to a door-lock function, 17c to a door-unlock function and 17d to a trunk-opening function. That is, when the tact switch 32 corresponding to the function display 17b is pushed, a signal for locking the door is transmitted. When the tact switch 32 corresponding to the function display 17c is pushed, a signal for unlocking the door is transmitted. Similarly, when the tact switch 32 corresponding to the function display 17d is pushed, a signal for opening a trunk is transmitted. Though four tact switches 32 are provided as shown in FIG. 4, only three functions are allocated to the respective tact switches 32 as shown in FIG. 1. Therefore, in this particular arrangement, one more function can be allocated to the vacant tact switch 32.

The front film 17 is integrally molded together with the front case 11, leaving the openings 11f un-molded. Therefore, each opening 11f is circularly surrounded by the molded portion. Thus, the openings 11f are sealed by the molded portion and kept water-tight. A spacer 11g formed together with the front case 11 by resin molding is disposed between the front film 17 and each tact switch 32. The thickness of the spacers 11g is different from spacer to spacer to adjust a distance between the front film 17 and each tact switch 32. This adjustment is necessary because the front film 17 is not flat but curved as shown in FIG. 4. The plane shape of the spacer 11g is substantially the same as the plane shape of the tact switch 32. It is round in this particular embodiment. The plane area of the spacer 11g is made a little larger than the plane area of the tact switch 32.

As shown in FIG. 4 (details shown in FIG. 6), a first sealing member 18b is disposed between the front case 11 and the rear case 12 to seal the portion connecting both cases 11, 12. The first sealing member 18b is integrally formed with a water-preventing cover 18a that covers an entire surface of the electronic circuit board 30. The first sealing member including the water-preventing cover 18a is made of a rubber material.

Referring again to FIG. 1, a light source 35 such as a light emitting diode is provided in the case 10, and the light from the light source 35 is emitted through a transparent portion 17e of the front film 17. In this embodiment, the light is lit when the battery voltage is normal, and the light is turned off when the battery voltage decreases to a level that is unable to operate the electronic circuit board 30.

Figure 2:
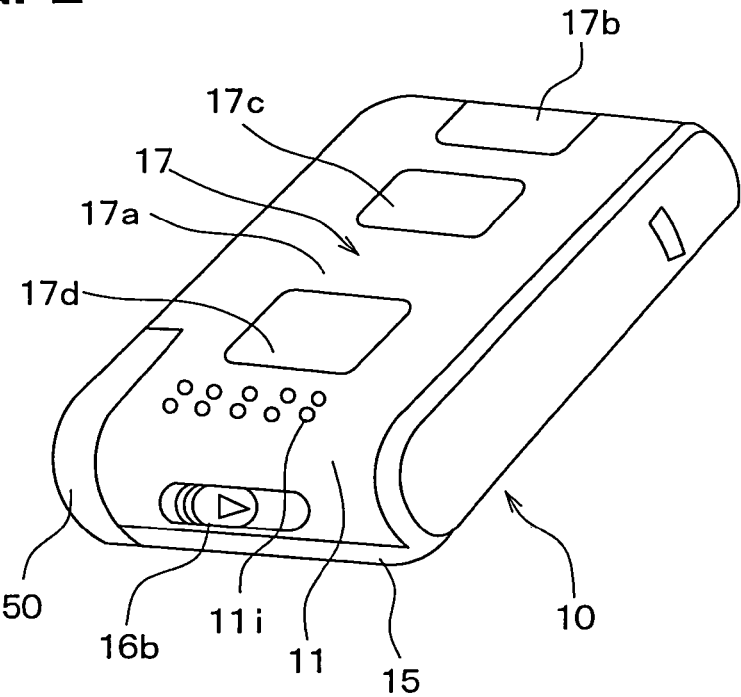
FIG. 2 is a perspective view showing front and bottom sides of the portable transmitter shown in FIG. 1.
Figure 3:
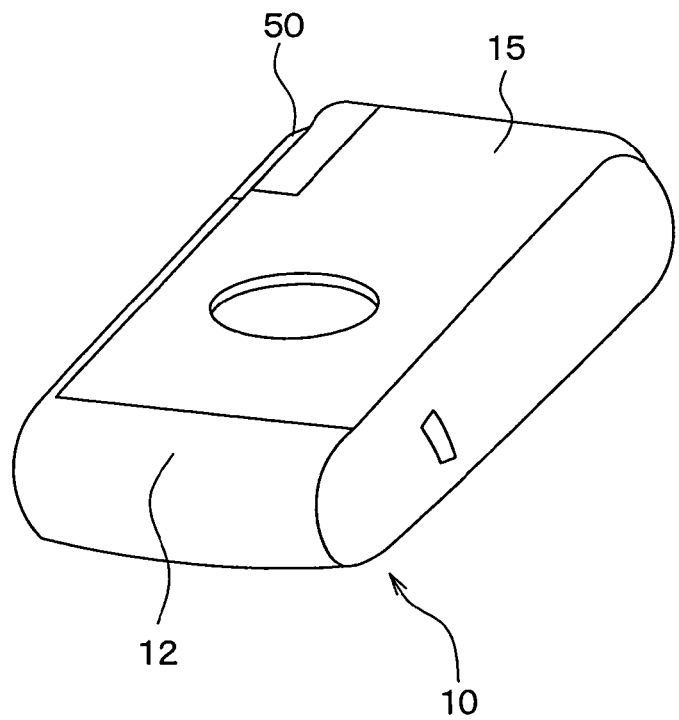
FIG. 3 is a perspective view showing rear and top sides of the same portable transmitter.

As shown in FIGS. 1 and 2, plural projections 11i are formed on the front surface of the front case 11, so that the user can recognize the top side and the bottom side of the transmitter by blind-touch. As seen in FIG. 4, portions of the front film 17 corresponding to the function displays 17b, 17c, 17d are a little depressed from other portions, so that the user can find the respective function displays by blind-touch. Depressing the portions corresponding to the function displays also helps avoid unintended operation of the transmitter.

Now, operation of the transmitter will be described. First, operation under a normal condition where the battery voltage is normal, i.e., higher than a predetermined level will-be explained. When the transmitter is located within a first area which is apart from an automobile by a predetermined distance, a receiver mounted on the automobile receives the ID code automatically transmitted from the transmitter. If the ID code pre-installed in the receiver coincides with the ID code transmitted from the transmitter, an actuator for locking or unlocking the door is operated.

On the other hand, when the transmitter is located in a second area which is farther from the automobile than the first area, the ID code transmitted from the transmitter is not received by the receiver mounted on the automobile. In this case, the ID code is transmitted from the transmitter by manually pushing the tact switch 32, and this ID code can be received by the receiver. Upon receiving the ID code, the actuator is similarly operated. In this manner, the door is locked or unlocked without using a mechanical key.

In the case of the keyless-starter system, when the user possessing the transmitter sits on the automobile seat, the ID code automatically transmitted from the transmitter is received by the on-board receiver. If the received ID code coincides with a pre-installed ID code, an ignition switch is turned on and an engine is started. Thus, the engine is automatically started without using a mechanical key.

Secondly, operation under an abnormal condition where the voltage of the battery 20 dropped to a voltage level that is unable to operate the electronic circuit board 30 for transmitting the ID code will be explained. The user may take out the mechanical key 50 contained in the transmitter by operating the lever 16b to release the key hook 16c. The user may lock or unlock the door with this mechanical key 50.

When the user wants to start the engine under the abnormal condition, the user inserts the transmitter into a slot formed near a driver's seat. A caller installed in the slot sends a signal requesting the ID code to the transponder 40 contained in the transmitter. Electric power is automatically supplied to the transponder 40 from the automobile by means of electromagnetic induction, and the transponder 40 transmits the ID code to an on-board receiver. If the ID code received by the on-board receiver coincides with a pre-installed ID code, the ignition switch is turned on to start the engine. The ID codes mentioned above are all encrypted for security purpose.

Figure 9:
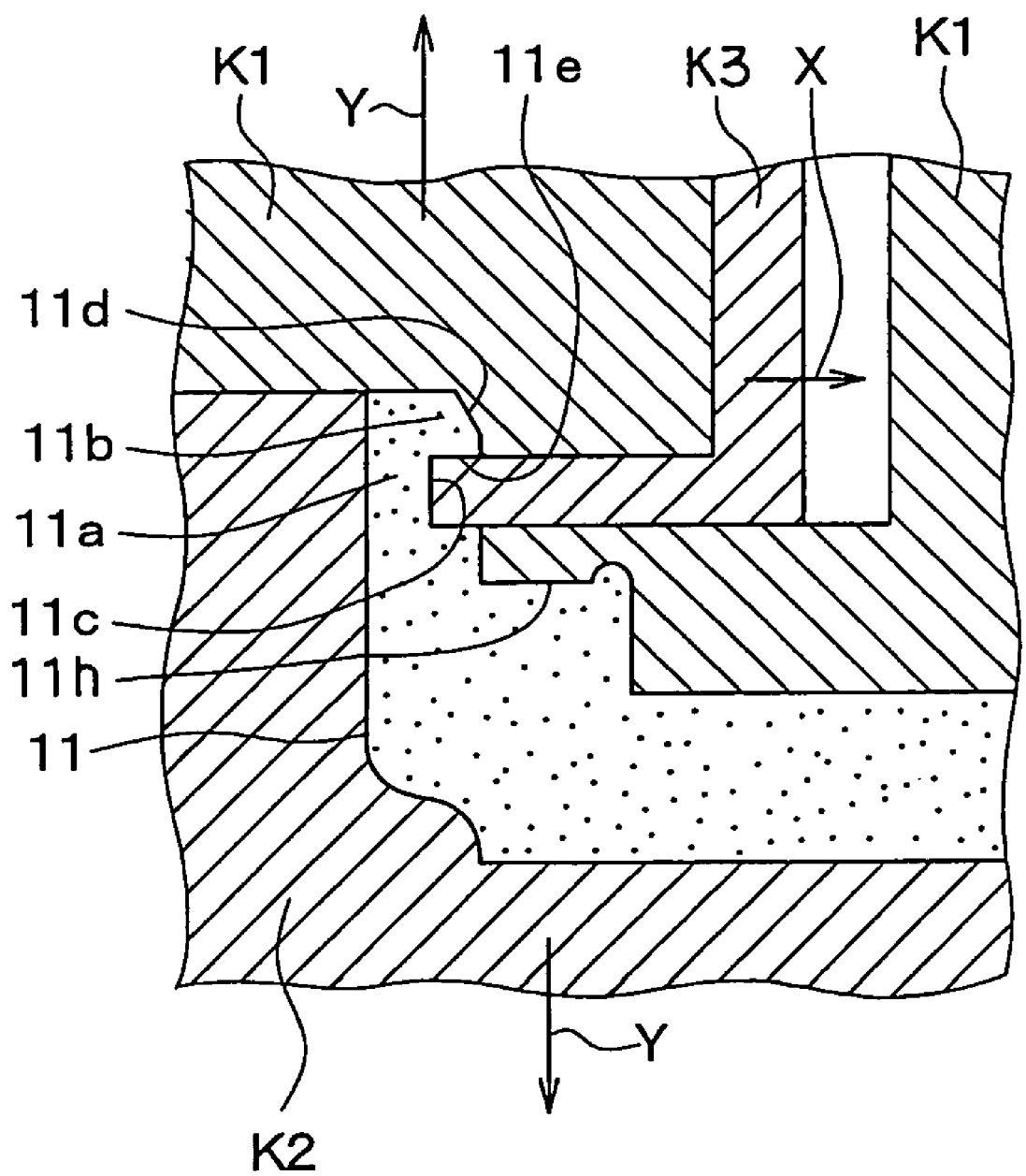
FIG. 9 is a cross-sectional view showing part of dies for molding the front case of the transmitter.
Figure 10A:
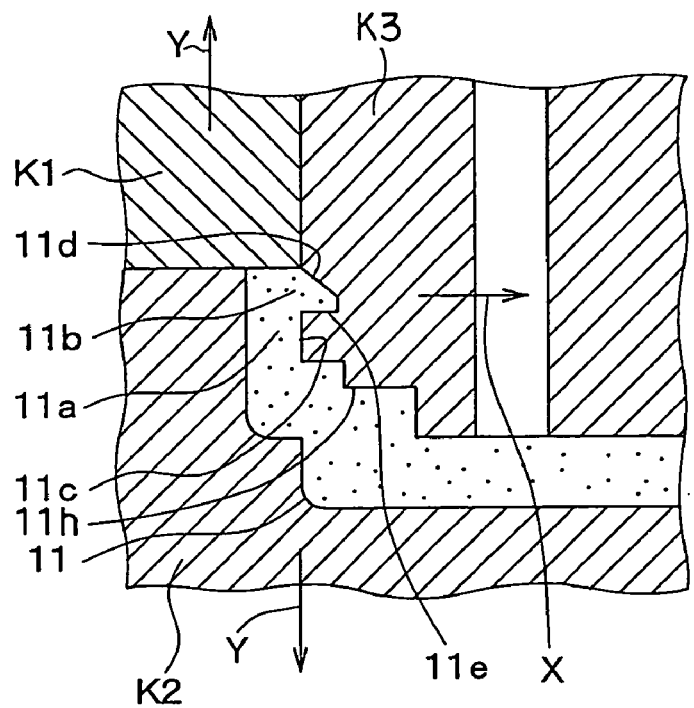
FIG. 10A is a cross-sectional view showing another example of the dies for molding the front case of the transmitter.
Figure 10B:
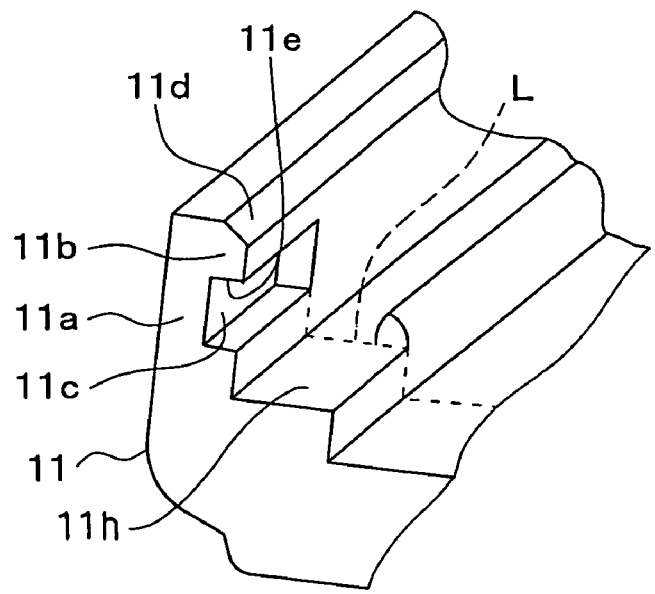
FIG. 10B is a perspective view showing part of a front case molded with a resin material using the dies shown in FIG. 10A.

FIG. 9 shows relative positions of molding dies K1, K2 and a slidable die K3 used in a process of molding the front case 11. The depression 11c is formed by the slidable die K3 that is slidably moved in direction X after the front case 11 is molded. All other portions of the front case 11 are formed by the molding dies K1 and K2 which are separated in direction Y after the front case 11 is molded. The sealing surface 11h which contacts the first seal member 18b is not formed by the slidable die K3, but it is formed by the molding die K1. In this manner, it is avoided to form a slide line L shown in FIG. 10B on the sealing surface 11h. If the slide line L is formed on the sealing surface 11h, the portion connecting the front case 11 and the rear case 12 cannot be sufficiently sealed. FIG. 10A shows a molding process in which the sealing surface 11h is formed by the slidable die K3. In this case the slide line L is formed on the sealing surface 11h as shown in FIG. 10B.

According to the present invention, the case 10 is formed by firmly connecting the front case 11 to the rear case 12. Therefore, it is very difficult to open the case 10 without breaking the case 10. If the case is forcibly opened to steal the transponder 40 contained therein, it is unavoidable to leave the trace. The owner of the transmitter immediately recognizes something unusual occurred to the transmitter. Therefore, the possibility that the door is open or the engine is started using the stolen transponder 40 can be considerably reduced.

The present invention is not limited to the embodiment described above, but it may be variously modified. For example, though the front hooks 11a are provided in the front case 11 and the rear hooks 12a are provided in the rear case 12 in the foregoing embodiment, only the front hooks 11a or the rear hooks 12a may be provided, eliminating the other hooks. Though the first area where the ID code is automatically transmitted and the second area where the ID code is manually transmitted are provided in the foregoing embodiment, it is, of course, possible to eliminate the first area. In other words, the ID code may be transmitted only by pushing the tact switch 32.

The present invention is applied to the transmitter used in the keyless-entry system and the keyless-starter system in the foregoing description. However, the transmitter according to the present invention may be used in other systems. Further, application of the present invention is not limited to the automotive systems, but it may be applied to other systems such as a keyless entry system for doors of independent houses or apartment rooms.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A portable transmitter comprising:
   a transponder that transmits an ID code to operate a device;
   a battery that supplies electric power to the transponder;
   an electronic circuit board connected to the transponder; and
   a case that contains the transponder, the battery and the electric circuit board therein, and the case includes a front case member and a rear case member, wherein:
   the front and rear case members are firmly engaged with each other such that the front case member cannot be separated from the rear case member without breaking the case;
   the front case member includes a front hook having a first engaging surface that extends in a longitudinal direction of the case;
   the rear case member includes a rear hook having a second engaging surface that extends in a longitudinal direction of the case; the first and second engaging surfaces closely contact each other;
   the rear case member includes a separating wall and an opening that allows the battery to be loaded or unloaded; and
   the transponder is completely confined in a space separated by the electronic circuit board and the separating wall.

2. The portable transmitter as in claim 1, wherein each of the front and rear hook has a projection and a depression, and the first and second engaging surfaces are formed at a boundary of the projection and the depression of each hook.

3. The portable transmitter as in claim 2, wherein:
   both of the front and rear case members are formed by molding a resin material;
   a first seal member is disposed between the front case member and the rear case member to keep the case water-tight;
   the depression is formed by a slidable core having a projected portion corresponding to the depression; and
   a sealing surface of the front case member contacting the first seal member is formed by a core other than the slidable core.

4. The portable transmitter as in claim 1, wherein one of the front hook or the rear hook is made easier to break than the other when a force is applied to forcibly separate the front case member from the rear case member.

5. The portable transmitter as in claim 1, wherein a second seal member is located around the opening to form a water-tight seal where the opening is closed with a battery cover.

6. The portable transmitter as in claim 1, wherein:
   the electronic circuit board transmits the same ID code as the ID code transmitted from the transponder;
   the ID code is transmitted from the electronic circuit board to allow the device to operate under a normal condition where a voltage of the battery is higher than a predetermined level, and
   the ID code is transmitted from the transponder to allow the device to operate under an abnormal conditions in which the voltage of the battery is lower than the predetermined level.

* * * * *